United States Patent
Biggin et al.

(10) Patent No.: US 11,869,293 B2
(45) Date of Patent: Jan. 9, 2024

(54) BUILDING CONTROL SYSTEMS

(71) Applicant: QCIC Limited, London (GB)

(72) Inventors: Patrick Biggin, London (GB); Mark Rowan, London (GB)

(73) Assignee: QCIC LIMITED, London (GB)

( * ) Notice: Subject to any disclaimer, the term of this patent is extended or adjusted under 35 U.S.C. 154(b) by 1091 days.

(21) Appl. No.: 16/338,852

(22) PCT Filed: Oct. 12, 2017

(86) PCT No.: PCT/GB2017/053085
§ 371 (c)(1),
(2) Date: Apr. 2, 2019

(87) PCT Pub. No.: WO2018/069712
PCT Pub. Date: Apr. 19, 2018

(65) Prior Publication Data
US 2021/0304541 A1    Sep. 30, 2021

(30) Foreign Application Priority Data

Oct. 12, 2016  (GB) ...................................... 1617315
Nov. 18, 2016  (GB) ...................................... 1619541
Jul. 17, 2017  (GB) ...................................... 1711478

(51) Int. Cl.
G05B 11/01    (2006.01)
G07C 9/22    (2020.01)
(Continued)

(52) U.S. Cl.
CPC ................. G07C 9/22 (2020.01); G06F 8/61 (2013.01); G06F 9/44505 (2013.01);
(Continued)

(58) Field of Classification Search
CPC ....................................................... G07C 9/22
(Continued)

(56) References Cited

U.S. PATENT DOCUMENTS 5,812,054 A * 9/1998 Cohen .................... G08B 25/14
379/38
5,971,595 A * 10/1999 Grant ...................... G06F 30/34
716/126
(Continued)

FOREIGN PATENT DOCUMENTS

| EP | 2763062 A2 | 8/2014 |
|---|---|---|
| JP | 2006092192 A * | 4/2006 |
| WO | 2016154320 A1 | 9/2016 |

OTHER PUBLICATIONS

International Search Report and Written Opinion for International Application No. PCT/GB2017/053085 dated Feb. 9, 2018; 12 pgs.
(Continued)

*Primary Examiner* — Evral E Bodden
(74) *Attorney, Agent, or Firm* — CANTOR COLBURN LLP

(57) ABSTRACT

A computer implemented method of programming access controllers in an environment, the method comprising the steps of: receiving an image file representative of the environment to be controlled, said image file comprising one more indicia representative of a device controlling access for an access point in the environment, said indicia comprising data representative of the requirements of the device; for each of the one or more indicia present on the image file identifying a device and associated device configuration data for the identified device, wherein the identified device complies with the requirements indicated by the indicia; writing the identified device data and associated configuration data into a format readable by a security management system and programming said security management system with the identified device data and associated configuration data.

24 Claims, 8 Drawing Sheets

(51) Int. Cl.
  *G06F 16/55* (2019.01)
  *G06F 16/583* (2019.01)
  *G06V 20/10* (2022.01)
  *G06F 8/61* (2018.01)
  *G06F 9/445* (2018.01)
  *G06Q 10/06* (2023.01)

(52) U.S. Cl.
  CPC ............ *G06F 16/55* (2019.01); *G06F 16/583* (2019.01); *G06Q 10/06* (2013.01); *G06V 20/176* (2022.01)

(58) Field of Classification Search
  USPC .......................................................... 700/19
  See application file for complete search history.

(56) References Cited

U.S. PATENT DOCUMENTS

| | | | | |
|---|---|---|---|---|
| 6,088,802 | A * | 7/2000 | Bialick | .................. G06F 21/34 |
| 10,032,086 | B2 * | 7/2018 | Mankovskii | .............. G06T 7/55 |
| 2005/0119767 | A1 * | 6/2005 | Kiwimagi | ............ G05B 19/042 |
| | | | | 700/83 |
| 2006/0009861 | A1 * | 1/2006 | Bonasia | .............. H04L 12/2809 |
| | | | | 700/20 |
| 2007/0268515 | A1 | 11/2007 | Freund et al. | |
| 2010/0064146 | A1 | 3/2010 | Boles et al. | |
| 2010/0321151 | A1 * | 12/2010 | Matsuura | ................ G06F 21/32 |
| | | | | 707/769 |
| 2012/0284326 | A1 * | 11/2012 | Ennis | .................... G06Q 10/06 |
| | | | | 709/203 |
| 2021/0304547 | A1 * | 9/2021 | Hasty | ...................... G07F 9/009 |

OTHER PUBLICATIONS

Great Britain Search Report for Application No. GB1619541.4 dated Jul. 11, 2017; 4 pgs.

\* cited by examiner

BUILDING CONTROL SYSTEMS

CROSS REFERENCE TO RELATED APPLICATIONS

This application is a National Stage Application of Patent Application PCT/GB2017/053085 filed on Oct. 12, 2017, which claims the benefit of and priority to Great Britain Application No. GB1617315.5, filed Oct. 12, 2016, Great Britain Application No. GB1619541.4, filed Nov. 18, 2016 and Great Britain Application No. GB1711478.6, filed Jul. 17, 2017, the contents of which are incorporated herein by reference in their entirety.

TECHNICAL FIELD

The present invention relates to system and method for defining and programming systems in a building or environment.

BACKGROUND TO THE INVENTION

In an environment, such as a building, it is often desirable to restrict the access to certain points of the environment. Access to certain points may be controlled through the use of doors, scanners, card readers etc. Access may be restricted through the use of doors, strongboxes, turnstiles etc.

In such environments the ability for an individual to access may be control through the use of permissions which define the access control. The access control is typically monitored and controlled via a central server which will allow access (e.g. open a door) provided that the end user can demonstrate that they have the correct permissions to access the access point (e.g. swiping a fob, entering a personal identification number (PIN) code).

When determining the access points for an environment, an industry expert will typically carry out an on-site survey of the building/environment in question. The survey should identify every point in the environment which requires Access Control. For example the points may be doors which require special permissions or devices (such as pin code or key fob) to open or access. When such points are identified in the survey they are recorded, and typically transferred onto a graphical representation of the environment. Such a representation may be in form of a computer-aided design (CAD) drawing of the environment.

As is known in the art, there are multiple manners in which an individual access point may be controlled, with each access point having different behaviours and configurations. For example a door controlling access to a particular room may have many different behaviours which define how it may be opened and used to access the room, such as the type of lock.

This behaviour must be determined and recorded for each access point individually. The information is typically recorded on the design document. This is typically called "commissioning" where the environment and its access is defined.

Once the environment has been defined and the commissioning is complete the actual system "programming" whereby a trained user must use the previous documentation produced to program and configure every device. Once programmed, the user must review the configuration and fully document the "as installed" system whereby the exact configuration of each device is recorded on documentation that can then be used as to test device behaviour against.

In building environments it is further known to define how computing devices within the environment can connect to a network hosted within the environment. For example in an office the computing devices may comprise a number of portable or desktop computers, devices such as printers, scanners, facsimile machines etc. Furthermore an important aspect in such environments is the definition as to how data within the network is transmitted and how the data is forwarded to the appropriate devices. Network switches are known networking devices which help to interconnect different network-enabled hardware devices, allowing for communication between these devices.

In order to introduce "security" and "routing" of devices attached to these switches, they must be configured with a number of specific parameters, which help segregate, secure, prioritise and identify the devices that are attached to the switch. There are many different manufacturers of network switches and the software platform used to program them differs slightly but all require a user trained in the software [often with certification] to manually program this "software" in order to provide the above benefits. In a given single installation (e.g. an office) there may be several different types of network switches leading to further complications.

The programming the devices, for example via network switches is similar to that with described above regarding access points. In the first stage in the programming of one of these systems an industry expert carries out an on-site survey of the building/environment in question. The survey identifies every point in the environment which requires a network connection. As with access points the programming stage is often laborious and prone to error. In an environment such as a multi-storey building the number of access points may number in the thousands taking a considerable amount of time to complete, even by experienced programmers.

Similarly in building management other systems within a building require installation and commissioning. For example such systems include, but are not limited to, building management system, closed-circuit television, fire alarm systems, illumination (lighting) control and intruder detection.

Each system typically comprises a plurality of devices which will need to be identified and installed in a building. As with the building access control and network switches this typically involves an industry expert carrying out an on-site survey and having to manual program each device for the building. Such processes are costly, time consuming, and open to error.

SUMMARY OF THE INVENTION

Accordingly, to overcome at least some of the above problems there is provided: a computer implemented method, and system, of identifying and programming one or more devices in an environment, the method comprising the steps of: receiving an image file representative of the environment in which the devices are to be installed, said image file comprising one more indicia representative of a category of device to be installed in the environment, said indicia further comprising data representative of the requirements of the category of device; receiving a user defined data set, said user defined data set defining one or more behaviours, or properties, associated with one or more categories of devices; for some or all of the one or more indicia present on the image file identifying a device and associated device configuration data for the identified device, wherein the identified device complies with the requirements indicated by the indicia and furthermore wherein the identified device is selected based on the behaviours defined in the user defined data set; writing the identified device data and associated configuration data into a format readable by a installation system and programming said installation system with the identified device data and associated configuration data.

Advantageously the present invention therefore defines a system for automatically defining access control points based on decision logic for a given environment. Advantageously such a system also determines the appropriate behaviours of the devices based on decision logic in order to best identify which devices are required without the need for manual intervention.

In a further aspect of the invention there is provided a computer implemented method of identifying and programming one or more devices in an environment, the method comprising the steps of: receiving an image file representative of the environment in which the devices are to be installed, said image file comprising one more indicia representative of a device to be installed in the environment, said indicia comprising data representative of the requirements of the device; for some or all of the one or more indicia present on the image file identifying a device and associated device configuration data for the identified device, wherein the identified device complies with the requirements indicated by the indicia; writing the identified device data and associated configuration data into a format readable by a installation system and programming said installation system with the identified device data and associated configuration data.

Advantageously the system allows for the accurate and rapid programming of network access control points such as network switches.

There is also provided a method, and system, for determining commissioning data for one or more devices in an environment, the method comprising the steps of: receiving an image file representative of the environment in which the devices are to be installed, said image file comprising one more indicia representative of a category of device to be installed in the environment; selecting a user defined data set from a plurality of user defined data sets, each of the user defined data sets defining one or more behaviours, or properties, associated with one or more categories of devices; selecting a panel to be programmed from a plurality of different panel types; for some or all of the one or more indicia present on the image file identifying a device and associated device configuration data for the identified device, wherein the identified is selected based on the behaviours defined in the user defined data set; writing the associated configuration to the selected panel.

Furthermore such systems remove many of the errors associated with the commissioning process whilst providing a fully auditable system.

There is also provided a method of defining a user defined dataset each of the user defined data sets defining one or more behaviours, or properties, associated with one or more categories of devices and applying the user defined dataset to existing or subsequent projects for determining commissioning data for a building or facility.

Other aspects of the invention will be apparent from the appended claim set.

BRIEF DESCRIPTION OF DRAWINGS

Other features of the invention will be apparent from the following description of embodiments of the invention, illustrated by way of example only in the accompanying schematic drawings in which.

DESCRIPTION OF AN EMBODIMENT OF THE INVENTION

According to an aspect of the invention, there is provided a new system and methodology for automatically defining the devices and behaviours of devices for access control in an environment.

An aspect of the invention is that system is configured to take information from an image file and convert the information into files for use in installation of access control devices in an environment.

A further aspect of the invention is to utilise the information in order to programme one or more network switches.

By converting the information from an image file into an installation file the installation file can be more easily adopted across different platforms, as well as removing errors associated with human input during the commissioning phase.

Figure 1:
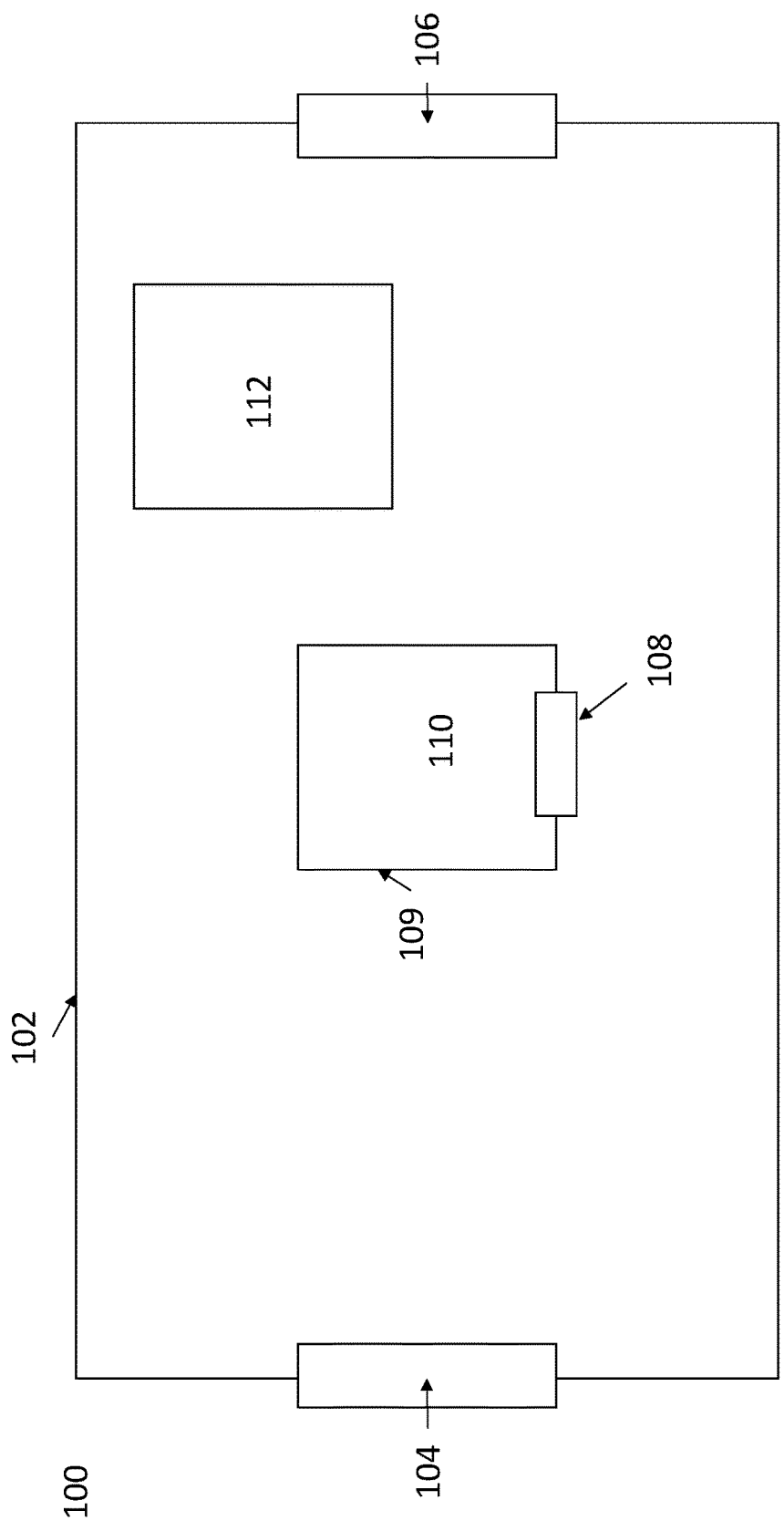
—FIG. 1 is an illustrative example of an environment.

FIG. 1 is an illustrative example of an environment for which access control and network routing and access has been defined. Whilst FIG. 1 is described with reference to both physical access control and network access the skilled person would realise that the following description described herein would apply to a system for defining just access control or just network access.

There is shown the environment 100, comprising an outer perimeter 102, a first access point 104, a second access point 106, internal walls 108, a third access point 108 to a controlled room 110, and a control logic 112. There is also shown a computer network 118, a first networked device 120, a second networked device 122, a third networked device 124, a network switch 126, central server 128, wherein the networked devices communicate with the network switch 126 and the central server 128.

FIG. 1 is a greatly simplified example of an environment provided to aide understanding of the invention. The skilled person would realise that the examples described herein are applicable to any type of environment where access control and device networking are required such as offices, multi-storey buildings, airports etc.

As shown in FIG. 1 the environment 100 is surrounded by an outer perimeter 102. The outer perimeter 102, in this example, has two access points 104, 106. In an example the first access point 104 is a door which is operated with a key fob and the second access point 106 is operated with a key pad on which a user enters a pass-code. In further examples any type of suitable device may be used. The skilled person would realise that the choice of device and the behaviour of the device are dependent on a number of different factors, such as type of access point, level of security etc.

As is known in the art whilst a given user may be allowed to enter the environment 100 but it may be desirable to further restrict access to a controlled room 110. Access to the controlled room 110 is via the third access point 108.

As is also known in the art the control logic 112 controls access to the various access points for the environment 100. The control logic 112 in the example shown is a central server which communicates with each access point via a wired or wireless network. In further examples the control logic 112 may be present at each access point as is also known in the art.

Within the environment 100 are three networked devices 120, 122, 124 (in further examples many more devices are present with three being shown for the purpose of explanation). The term networked device refers to a device which is connected to the network 118 and which communicates to one or more further devices as well as other aspects such as a server 128 and the internet (not shown). As is known each device is connected to a network switch 126 which further controls communication between the devices, as well controls communication between the system and the devices, in the known manner.

Figure 2:
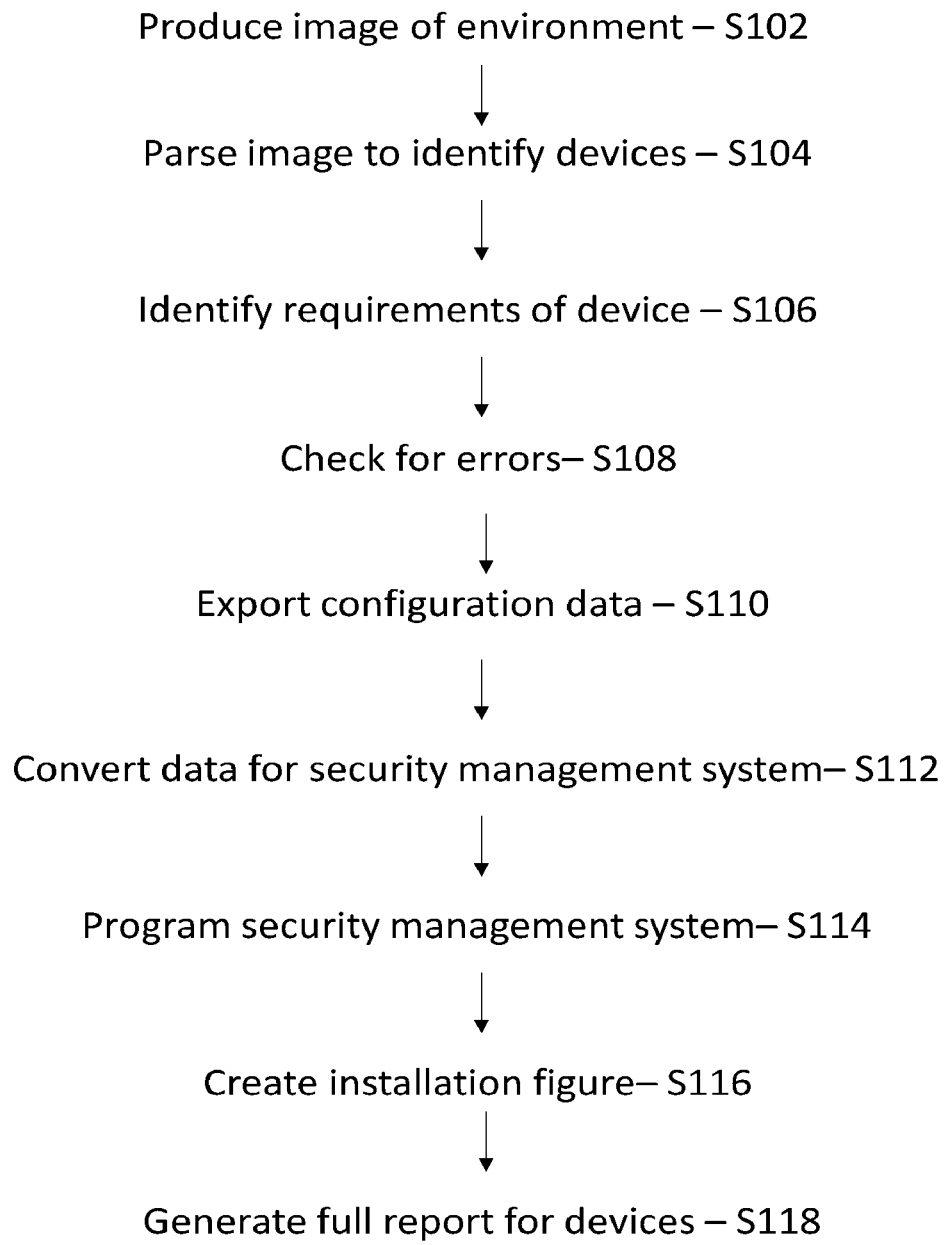
FIG. 2 is a flowchart of the methodology of defining the access control to an environment according to an aspect of the invention.

FIG. 2 is a flowchart of the methodology of the invention in which access points and the behaviours of the devices of the access point are automatically defined. This process results in the generation of the installation documentation defining the necessary information required to install the access control system in an environment. Such processes result in a more efficient system in which errors are reduced and optimal access control solutions are achieved.

At step S102 an image describing the environment (for example the environment shown in FIG. 1) is produced by an end user. In an embodiment such images are produced in an AutoCAD format using known methods. In further embodiments other computer readable formats are used to produce the image detailing the environment. For example a PDF document, such as those with layers, or other computer-aided design formats are used.

At step S102 the access points which require devices with specific behaviours are identified and marked on the image with some form of indicia. Said indicia being one or more of a specific icon, block, tag, metadata etc. with the shape or look of the icon varying according to user preference. The ability to identify and mark the access points using the indicia on the image is of importance as it allows the areas of importance to be easily identified.

Preferably the image data inputted by the user regarding the access point comprises information regarding the priority of the access point and settings.

In an embodiment a number of different icons may be placed a given access point. Each icon being representative of the requirement at the access point. For example different icons may be used to define the type of device and the level of security associated with the access point.

The image is therefore produced by an end user and results in areas which access points are identified. Preferably the image comprises, in the form of metadata, information regarding the specification for the environment detailing the level of access and security for the areas. This data may also be supplied separately to the image data, for example in the form of a text file.

At step S104 the image file is parsed and each instance of device is identified in the image. As the image is in a computer readable format and the areas of interested are identified via icons etc., the areas of interest are easily identifiable.

At step S106 for each instance of the requirement of a device in the environment identified at step S104 the device behaviour and specifications and configuration data for the device are identified. Each identified device is given a preferably unique identifier as well as assigned further data regarding location.

In a preferred embodiment the system comprises a pre-populated database defining devices, and specification of such devices, which can be used in an environment. The information parsed from the image is subsequently used to query the database in order to identify the most suitable device to be used for a particular access point.

In further embodiments where a number of suitable devices are identified a logic module (not shown) is used to determine the most suitable device for the access point. The logic module comprises a series of rules regarding the use of devices. Such rules may comprise rules regarding location of the device, types of other device in the vicinity or environment, internal layout of the environment etc.

Optionally the process further defines the step of checking for errors for the identified devices at step S106. In further embodiments this step occurs after the generation of the installation drawing. In yet further embodiments the error checking process occurs both before and after the generation of the installation drawings at step S116.

As described the devices are determined in accordance with the requirements identified. Each device is identified in order to determine if it has been properly defined with the correct installation information. Typical errors may include the device not being associated with an information, a device having the same identity as another device, or having duplicate configuration information. Further forms of errors may also be identified and accounted for. Examples of these errors are described below with reference to the example of a door being installed within the environment.

A device which does not have any information associated with it is known as an orphan block. An orphaned block is one that has been inserted into the drawing that has not been associated/connected to a door tag. The error occurs in this example where the installer does not provide any information regarding the nature of the device. As such the device, in this example a door, therefore would remain in the drawing without any installation information associated with it. The lack of the information is highlighted to the user, and allows the user to repeat the above steps to include the required information.

Another known error is two or more devices (e.g. doors) having duplicate tag, or identification data. In the installation environment in order to ensure each device has the correct installation information duplicate instances of identification information are identified and presented to the user as errors.

Furthermore, instances of duplicate configuration information for the same device are identified. Such duplicate instances of configuration information is not necessarily an error but would need to be highlighted to the end user for further checking. In the example of a door, a double leaf door may legitimately have two identical instances of position and lock information. However, a single door having two identical instances of position and lock information would be an error.

Further examples of errors include two or more devices having positional information that would be incompatible.

For example if the positional information would indicate that the doors would be placed too close together then this would result in an error. Additionally errors may be identified regarding the choice of device. If a device is selected which is out-of-date or inappropriate for an environment this would be identified as an error.

Optionally where errors are identified they are indicated as such on the installation document. An end user installing the devices when presented with the document would therefore know that the information may be incorrect and can seek to resolve the error. Errors are preferably identified according to their severity. For example errors which would result in an incorrect installation are the most severe. Preferably for such errors the installation drawings are either not generated or a clearly marked as incorrect. For lesser errors, for example these are ranked as less important errors and may simply be flagged to the end user.

Accordingly the error check process provides a more secure installation environment.

Once the system has identified the suitable device as well as the behaviour and specification data for the device for a device the data is exported to a configuration data document at step S110. The configuration data document, in an embodiment, is in the form of a spreadsheet and comprises data including the device identifier, type of device and specification data for the device. In further embodiments the data is exported to other suitable document types.

Once the process has been completed for all devices the system proceeds to step S112 where the configuration data generated at step S110 is converted into a format for use in a security management system. As the configuration data generated at step S110 contains the relevant settings and specification data for the device the conversion process at step S112 may be performed utilising known methods in the art. The required format for the data is identified and the relevant data from the configuration data generated at step S110 is inputted into the relevant fields of the document.

At step S114 the converted documents are imported into the security management system thereby enabling the automatic programming of the controller(s) in the security management system. As such the process ensures that the data required to program the controller(s) in a security system is automatically generated in a consistent manner overcoming many errors and problems associated with the manual programming.

Furthermore, as a result of the above described process efficiencies in terms of speed and resources occur as well as standardising the system.

At step S116 utilising the identified data and the original image file an installation drawing is produced.

In a preferred embodiment each device identified at step S104 further has installation information associated with it. Such installation information is known and is typically specific to each type of device. The installation information is typically required during the installation in order for the installer to correctly install the device. At step S116 the instances of a particular type of device are identified, as well as the device requirements, and from such information the installation information is identified. The information is typically presented in the form of an installation drawing and said installation drawing may be presented as a stand-alone image or integrated into an existing CAD drawing of the environment.

Optionally, at step S118 a full report of the environment is generated. This full report provides the details of every device in the installation environment allowing for the owner of the installation environment to have a detailed overview and breakdown of the environment. Whilst some information would be accessible to the end user from the installation drawings the end user may need further information than is provided by the installation drawings.

At step S118 for each device determined and information regarding the installation parameters (as determined above) is recorded. Preferably product details regarding the device (such as type, serial number, cost, installation time etc.) are recorded. Furthermore, information regarding the specific behaviour of the device may have is also recorded in the report at step S118. Returning to the example of the device being a door, information specific to the door (for example is it alarmed, swipe permissions for entry, does an alarm sound if it is left open etc.) is recorded in the report at step S118. Therefore, in contrast to the installation information, the full report comprises detailed information regarding the devices installed in the environment. Furthermore the report may be updated after the installation has been completed. For example major incidents (alarms being sounded etc.) are recorded for audit purposes.

Figure 3:
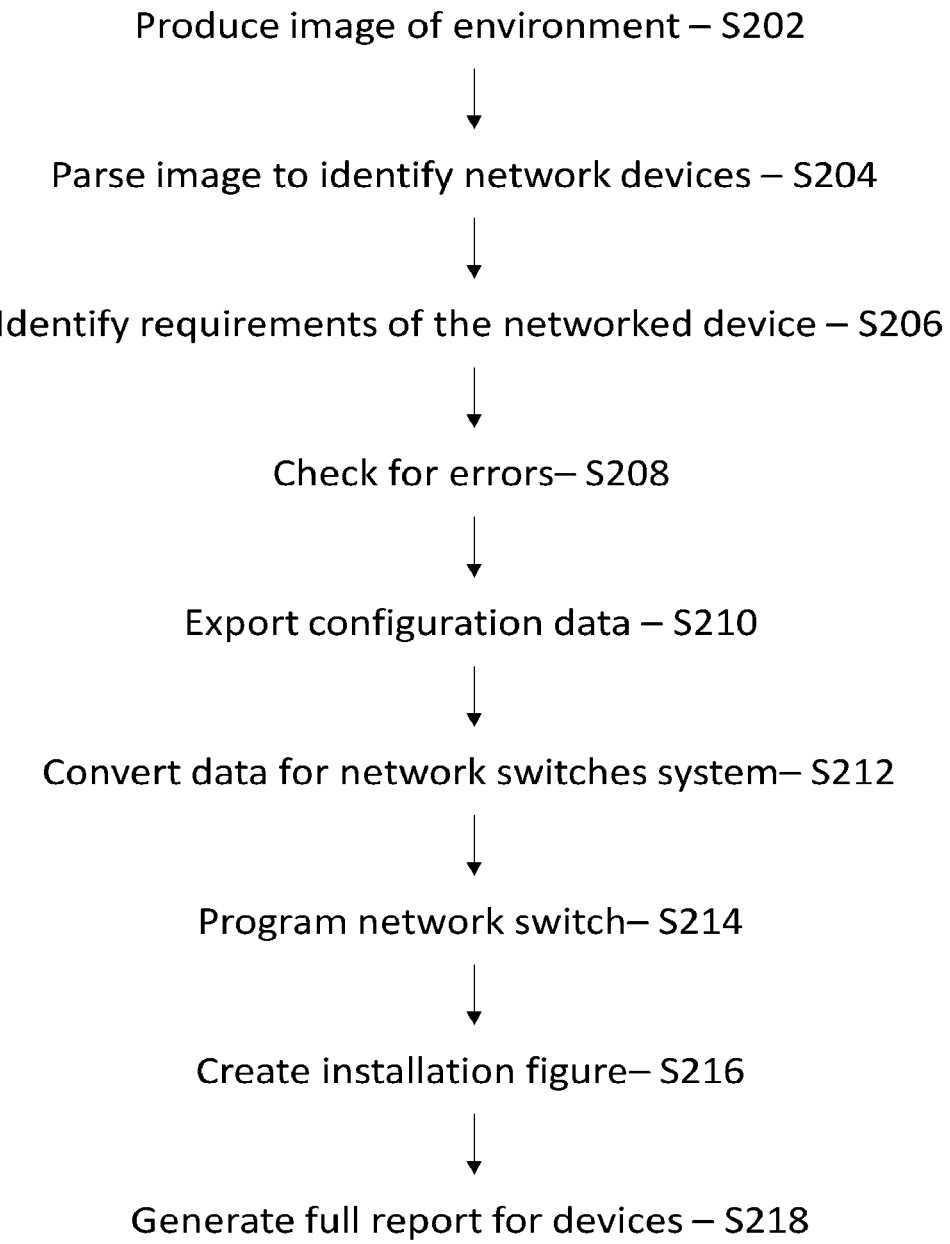
FIG. 3 is a flowchart of the methodology of programming the network switches for an environment according to an aspect of the invention.

FIG. 3 is a flowchart of the process for identifying networked devices and automatically programming a network switch for each identified device.

The process of automatically programming a network switch functions on the same principle as the automatic programming of the access control points. In particular, as described in detail below, the process utilises the same principle of editing an image of an environment to include devices and their locations and from the image automatically identifying the configuration of the device in order to enable the automatic programming of the network switch.

Steps S202 is substantially similar to step S102. At step S202 an AutoCAD drawing is produced with individual icons representing physical devices and their behaviours identified. At step S202 for each instance of a device the relevant icon is placed in the appropriate location on the image.

At step S204 the image file is parsed and each instance of device is identified in the image.

For each instance of a device identified at step S204, at step S206 from the icons the device behaviours and requirements for the device are identified, and a suitable device along with its configuration returned. As in step S106 there is a pre-populated database, and/or logic module which identifies the most suitable device based on the location and behaviour of the device.

In an example two devices are inserted into the drawing at step S202, are identified at step 204 and their parameters identified at step S206. The first device, device "1" is of type "A". Given the behaviours associated with the device, as identified in the image at step S202, device A is identified as being a closed-circuit television (CCTV) device which is suitable for an outdoor installation. As is further identified due the nature of the type "A" device, it must be locked down so that a specific MAC address must be assigned to a specific port on a switch. This is common for devices such as CCTV cameras which may be installed in locations outside of the secure perimeter of a building/site. During the installation the networking speed of the port must also be set (for example full-duplex/1000 kbps etc.). At step S206 the parameters regarding the particular device, which are held in a pre-populated database, are identified for device "1".

Similarly device "2" is, in an example an alarm of type "B". As such type "B" devices must have their speed ramped-down. This is common for devices such as intruder alarm panels which do not run properly on faster connections. The networking speed of the port must therefore be set

[for example half-duplex/10] in order for the device to work correctly. In addition these type of devices are commonly segregated from the rest of the network via "Virtual Local Area Networks (LANs)" or VLANs, as such ports connected to these type of devices must be configured into the relevant VLAN, for example "VLAN 30". At step S206 the above port configuration are identified.

Optionally at step S208 a check for errors in performed. The process regarding the checking for errors follows the same principles as step S108 where incorrect instances are identified and highlighted to the user.

At step S210 the device configurations identified for the devices at step S206 are exported into a configuration document. Again the process is similar to that described in step S110.

At step S212 the configuration data generated at step S210 is converted into a format for use in programming a network switch. The process is similar to that described in step S112.

At step S214 the document generated at step S212 is imported into a network switch management system thereby enabling the automatic programming of the one or more network switches in the environment. As the device and the parameters of the device are identified in a consistent manner this process overcomes many of the errors associated with the task can occur. Furthermore it results in efficiencies in terms of speed and resources occur as well as standardising the system.

At step S216, in a manner similar to step S116 an installation drawing is optionally produced.

Optionally at step S218 a full reported is generated for all devices identified and installed. Again the process regarding the generation of the report follows the same principles as step S118.

With respect to both the access control and network switches installation the information can be further supplemented to generate for one or more of the devices or network switches operations and maintenance data. For each selected device an individual report is generated. Multiple devices can be aggregated into the same report.

Figure 4:
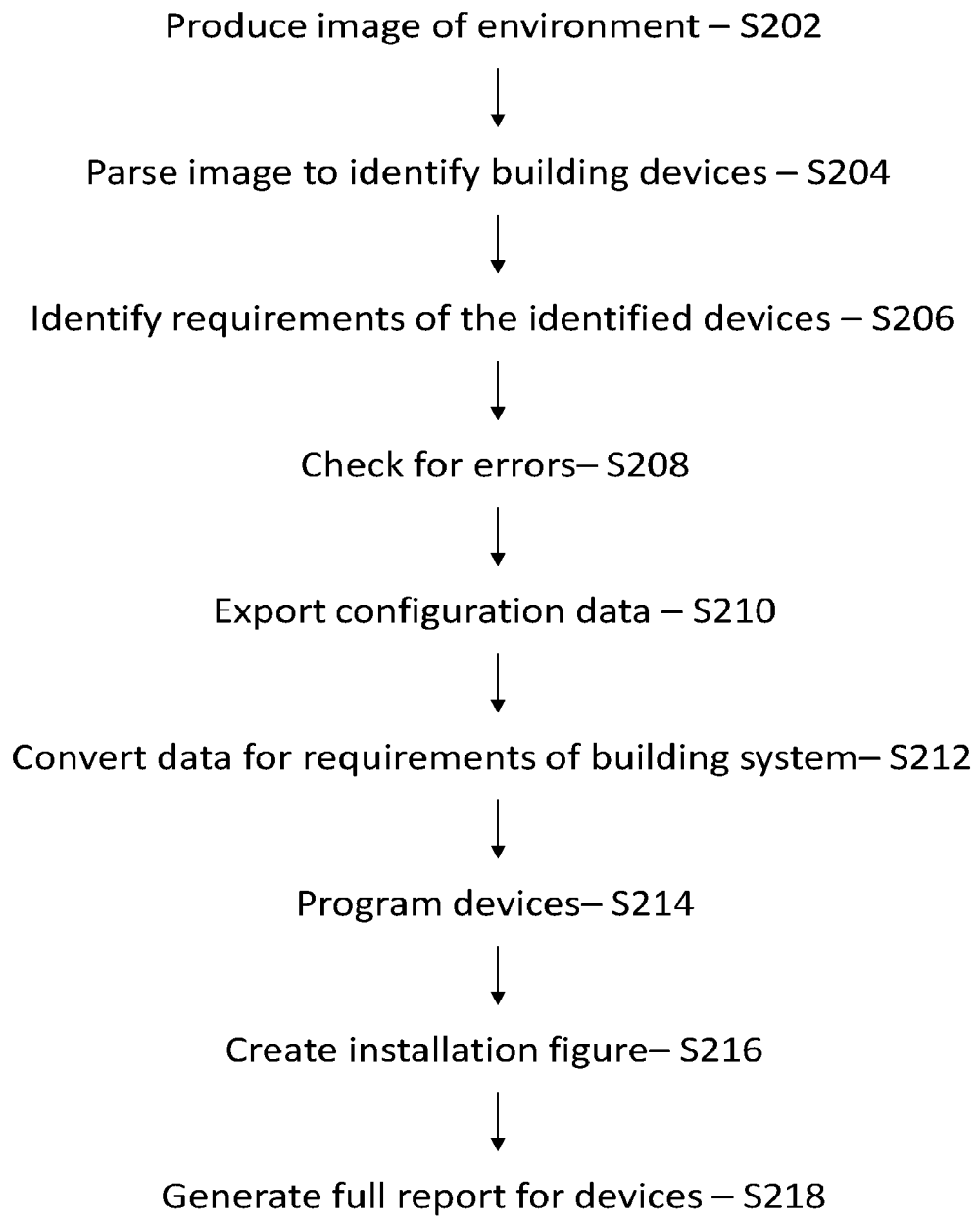
FIG. 4 is a flowchart of the methodology of programming one or more devices for use in a building system or environment according to an aspect of the invention.

FIG. 4 is a flowchart of the methodology of programming one or more devices for use in a building system or environment according to an aspect of the invention.

FIGS. 2 and 3 describe specific examples of the installation of devices for control systems and network switches. However, the toll described above may also be beneficially used in a number of different systems within a building environment. These systems included, but are not limited to, building management system, closed-circuit television, fire alarm systems, illumination (lighting) control and intruder detection.

FIG. 4 is a flow chart which describes how the principles described with reference to FIGS. 2 and 3 may be applied to other building systems.

At step S302 an image of the environment, which may be a building, a floor or part of building, is produced. As with steps 102 and S202 an AutoCAD drawing is produced with individual icons representing physical devices and their behaviours identified. In the example of the invention being used to help with the installation and commissioning of a CCTV system each camera, and the properties of the camera are determined. In the example of a fire alarm system, the type of device (e.g. smoke detector, audible alarm, carbon monoxide detector etc.) is identified with the appropriate icon. Furthermore, at step S302 features such as sprinklers, fire doors etc., may also be identified.

As with the examples described above an icon is assigned to each instance of a device in order to identify the device and its respective location.

At step S304 the image file is parsed and each instance of device is identified in the image. This step occurs in the same manner as described with reference to FIGS. 2 and 3.

Once the devices have been identified, their properties and requirements are determined at step S306. As described above based on the properties a suitable device is identified and returned along with the configuration data. Preferably, identification of the device and configuration data is performed using a logic module or pre-populated database.

The devices identified are specific to the system being installed and are identified in the same manner based on the icons used in the image in step S302.

At step S308 optionally a check for errors in performed. This process is as described with reference to step S108.

At step S310 the device configurations identified for the devices at step S306 and subsequently corrected at S308 are exported into a configuration document. Again the process is similar to that described in step S108.

At step S312 the configuration data generated at step S310 is converted into a format for use in programming and commissioning the device, as per step S112 and S212.

At step S314 the devices are programmed with the generated data.

At step S316, an installation drawing is optionally produced. This process is as per step S112.

Optionally at step S318 a full reported is generated for all devices identified and installed. Again the process regarding the generation of the report follows the same principles as step S218.

Thus the invention provides the flexibility and advantages for programming a number of devices within an environment. In particular the methodology herein described allows for a more secure system in which errors and time are reduced.

As well as providing advantages in terms of speed and accuracy utilising the above principles other advantages may occur.

Figure 5:
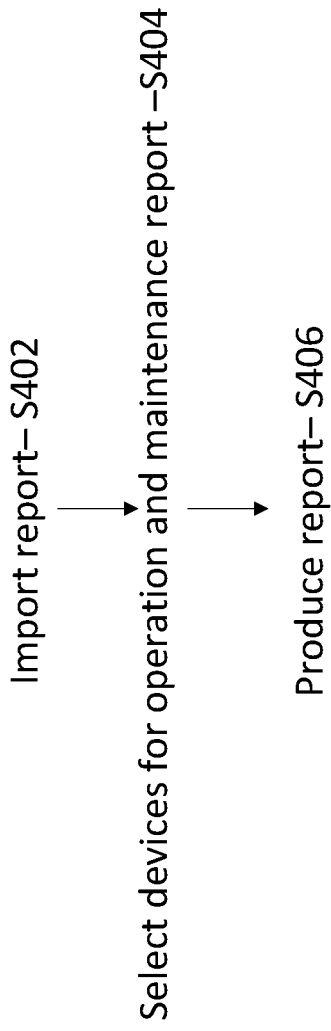
FIG. 5 is a flowchart methodology of generating a report of the operations and maintenance process.

FIG. 5 is a flow chart of the operations and maintenance process.

At step S402 the reports generated at step S118, S218 and step S318 are imported and a list of the available devices are presented to the user.

At step S404 the user selects the devices for which they wish to generate the operations and maintenance report. The selection occurs via known means, for example tick boxes, or drop down lists.

At step S406 the information regarding the device is generated. Preferably, for each device one or more photos of the device are also included. Preferably for each device further information such as the installation information, costs, are also included.

As such the process allows for the generation of reports which contain the necessary information in a manner which reduces errors.

A further aspect of the invention is take the commissioning data, as generated as described with respect to steps S112, S212, S312 in FIGS. 2 3 and 4 respectively, and to determine a standardised configuration data document. Such functionality allows for the installation data to be generated when it might not be available (for example if a new tenant is taking over a building) or when the data is not described in a consistent manner across all sites. As such it may be considered as a reverse engineering process.

Figure 6:
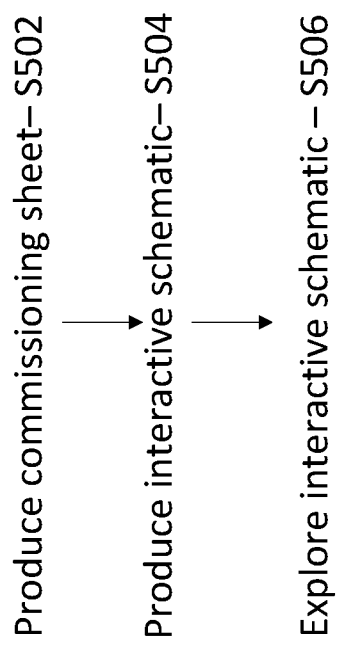
FIG. 6 is a flowchart methodology of generating commissioning documentation from a figure.

FIG. 6 is a flow chart of the creation of the standardised documentation.

At step S502 a commissioning sheet, comprising the information required to commission the device is produced. The production of such data occurs as described with reference to FIGS. 2, 3, and 4 in some embodiments. In further embodiments the data may be historic e.g. the installation has been completed and further information is required. The data typically comprises information the board on which the system was commissioned.

At step S504 an interactive schematic is produced. At step S504 an image of the circuit board on which the devices have been commissioned is produced. The image, in an embodiment, is taken from a pre-populated repository of images. Each image comprises a number of predefined fields defining certain properties required for the circuit diagram. Each field is presented on the diagram in the form of selectable field. The user is therefore able to view and select each field. As the board will have known properties where information is missing it is highlighted and presented to the user in order to allow the user to determine and complete the information.

In order to ensure consistency the commissioning sheet is produced in a standard format. As described above with reference to step S110 and S210 the commissioning sheet is generated by identified instances of the device and associating the device with the required commissioning instructions and placing the information into a standard format.

The Commissioning Sheet is therefore useful as a basis for creating testing sheets, or may be used to process through regular automation once more and force down client detailed reports into import files. Furthermore as described with reference to FIGS. 2 and 3 the data can be checked for errors and anomalies, or standardise configuration (e.g. standardising the configuration of doors).

At step 506 the user selects a field on the schematic and the appropriate part of the installation drawing is highlighted. By highlighting all of the devices, it is possible to build up a picture of how the circuit board should be wired (how it is programmed) within the system.

A further aspect of the invention is that whilst the above methodology is able to identify a suitable device, the device chosen may not necessarily be the most appropriate device for a given user. For example a device selected for a first user may not be entirely suitable for a second user. As such the system provides a configurable element in which the user is further able to define a set of behaviours through which the selection of devices is made.

Figure 7:
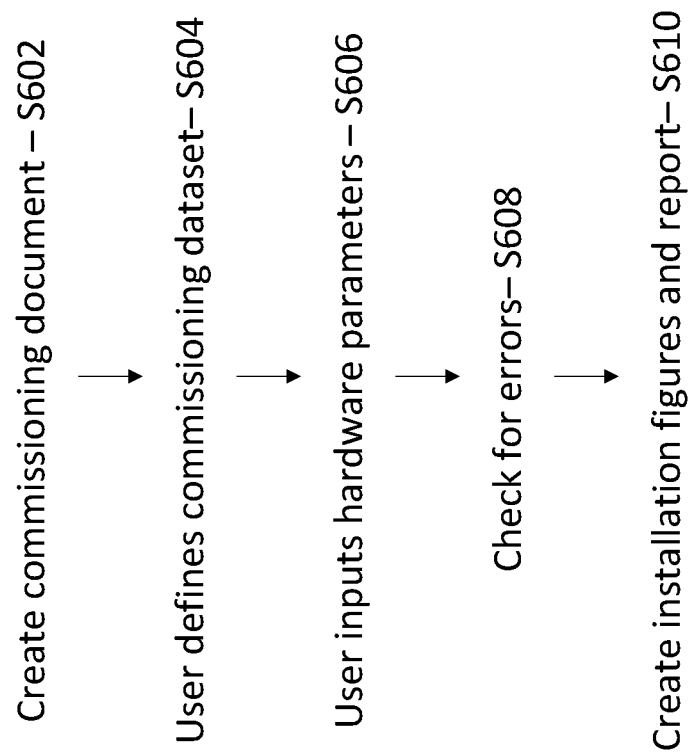
FIG. 7 is a flowchart methodology of defining a user, or building specific, commissioning sheet, according to an aspect of the invention.

FIG. 7 is a flowchart of the process of defining a user, or building specific, commissioning sheet, according to an aspect of the invention.

There is shown the feature of creating the commissioning documentation at step S602. The production of such data occurs as described with reference to FIGS. 2, 3, and. In particular the commissioning occurs by the editing of the file, such as an image file on which a user has inputted the type of devices at the locations of interest.

According to an aspect of the invention, there is provided a new system and methodology for automatically defining the devices and behaviours of devices for building management systems [as outlined above]. This definition of devices and behaviours is configurable by an end user so as to adjust the behaviours/programming details/naming of devices found within the commissioning/programming documentation according to the user preferences. Such processes ensure that the devices selected is the one most suitable to the user preferences.

Advantageously, this definition may be entered by the user prior to any processing, or after the determination of the devices (with the step S602 being rerun to ensure that the determined devices are the most suitable for the user).

At step S604 the user defines the preferences for the commissioning. At the commissioning step the user defines their preferences, or definitions that they wish implement across the building environment, or environments. For example in a building environment the selections may include (but are not limited to): Doors, Events, Hardware, Naming. Preferably completion of each of the sections is necessary to configure the user's preferences, which may conceptually be considered to be the building's deoxyribonucleic acid (DNA).

Thus at step S604 for each selection the user defines their preferences for that selection. For example the Hardware aspect would require the user to configure the hardware preferences for the hardware elements. In an embodiment the Hardware section details all the different hardware devices that are represented by Computer-aided drawing indicia. As described above the indicia represents the global category of product (for example door). Thus typically for each indicia displayed multiple different types of devices may be applicable.

At step S606 the User is then prompted to configure the different hardware types from a list of types. For example hardware for access control card reader hardware types. At step S606 the user inputs the various parameters for the hardware. Such parameters may include behavioural parameters, logical settings and product selection.

The behavioural parameters define the behaviour of the devices that the user would like to exhibit. Various products will display various behaviours depending on their product type and programming. Continuing with the example of access control card reader hardware types, the User may select from a product type from a list including Bar Code Readers, Iris Scanners, Electronic PIN pads, fingerprint readers along with other hardware devices typically used for access control in building environments. In such an example once the user has selected a product type the user may select a particular type of device, or include further information regarding the device behaviour. For example, if the user were to select an encrypted card reader they would be presented with a range of encrypted card reader products from which to associate with the device, such products may be from a range of different hardware manufacturers, or asked to define further behaviours associated with the device. In the event that a product is selected the process automatically associates that product with a corresponding computer-aided drawing indicia readable as per steps S104. Alternatively, the user is additionally able to see information related to product specific attributes, such as the commissioning rate for that product, the commissioning time (in hours), the install rate for that product, the install time (in hours) and the cost per unit for that product. Furthermore the user is able to edit the product specific attributes according to their preferences, preferably from pre-populated options, or self-defined options. For example the User may select a commissioning rate of "a", "b" or "c" which would correspond to three different pre-populated commissioning rates, e.g. "a" would mean a rate of "26.35", "b" a rate of "31.25" and so on. This allows the user to configure cost and time associated with a particular product within the DNA.

The User may further define attributes and edit the actions and values associated with the selected hardware, events, doors, naming or other section of the configuration. Continuing with the example of a hardware type of a reader, specifically an access control card reader, the User is able to configure the action and values associated with a behaviour of the hardware device type, for example the User may configure the card reader to 'beep' when a card is placed next to it; additionally the User may specify whether a PIN is required, additional parameters are available to be set by the User.

As a further example, the User may select a section on "Doors", and select a specific hardware type of a "Door". The User is then presented with a range of configurable parameters for the door type, such as whether the door alarm should be continuously active, whether a breach of the door should be sent to a monitoring station, along with other parameters. As another example, the User may use the interface to select to configure "Events" which will allow the User to configure the priority of events, messaging and description associated with a particular event occurring within the eventual building management system. As an example of an event, a door may have a different event linked to it depending on whether it is held open, or forced open. The User may select "Door Forced" from the interface and then configure the parameters associated with that "Door Forced" event, such as sounding an alarm.

As a further example, the User may use the interface to select to configure "Naming" which will allow the User to set naming conventions to be applied to commissioning sheets and import files. This allows the User to configure the naming convention for individual devices.

Therefore at step S606 the user is able to further define the devices and behaviours for each type of device. Part of the invention is that it allows for the differences in device behaviour and functionality to be taken into account.

In addition to the defining of behaviours associated with individual devices the user may configure logical settings for the hardware device type. The logical settings determine the manner in which the Device type interacts with other devices within the building management system (or other environment in which the device is installed), in order that the building management system works in a manner which is logical for an end user (e.g. a worker in the case of an office block).

For example for a device, such as a Request to Exit device, the user may assign a name and a priority for the device type (e.g. priority 2) which will be order in which the device is automatically set to within the access control system. Such data is used in the commissioning sheet to define that the request to exit device is given that particular priority (i.e. priority 2 in the example given).

Furthermore, the naming conventions used to define the devices can also be defined.

Thus at this step all behaviours, characteristics and programming details are created for all devices/device types that are of interest to the user. Once these details have been captured/adjusted the system holds a data set ("DNA") for the given user which defines exactly how the user wishes for the given devices to behave. Advantageously this dataset or "DNA" can then be used every time the user wishes to process documents through the system.

Preferably the documentation is error checked at step S608 (with the step of error checking performed in the manner as described above) and if the "commissioning/programming documentation" meets the format requirements of the system the process continues to step S610 for determination of the appropriate devices. Preferably at step S610 based on the documentation formatting the system and device type the documentation has been generated for is determined. As per step S106 the device and the requirements are determined. Each of the devices identified on the document are then used as a reference to look up the set of behaviours from the user specified behaviours (the "DNA") to determine the settings and behaviours the device. Once identified these settings are applied to the device in accordance with the parameters inputted by the user. Accordingly the behaviours and settings translate to particular parameters and details within the configuration file of a given system. Based on the system type—as identified by the system when the documentation is first processed—the template for the configuration file is generated and the individual settings and parameters for each of the devices are added until all of the devices that were found on the documentation have been mapped in and added to the configuration file[s]. Once this process is completed, the configuration file[s] and the commissioning/programming files that were used to generate them are saved to the interface for the user to download and use to import/apply to the "control software".

Once the devices, and their behaviours have been identified the installation figure and report are generated at step S610. This step occurs as per, for example, steps S116 and S118.

Advantageously, the present system allows for greater configurability of the system.

Preferably the user defined data set (the "DNA") is stored in a memory and reused when appropriate. The user defined data set is stored with some metadata describing the context, or discipline of the data. For example, a particular type of building use (e.g. a carpark) will typically have different behaviours than for another building use (e.g. offices). Similarly the behaviours for different usages (e.g. access control, security, network devices) Thus the metadata defines a discipline for the data set (e.g. Advanced Access Control System, Closed Circuit Television, Car Park Management System, Electrical Containment, Hotel Access Control System, Hostile Vehicle Mitigation System, Intruder Holdup Alarm System, Security Safe, Wireless Art Detection System, Voice Communication Intercom etc.) which is used to identify the usage of the data set.

Accordingly, in an embodiment when a user has created their commissioning document, by introducing the locations of the devices on an image file the user is able to select a discipline for the location (e.g. security, access control, carpark, office etc.) and based on the selection one or more data sets are identified and presented to the user. The user is further able to select the data set (or DNA) and based on the selected data set the devices are automatically identified and the installation figure and report data (as per step S612) is generated with the relevant data.

A further advantage of the use of the user data set, or DNA, is with respect to the reverse engineering process as described with reference to FIG. 6.

In an embodiment of the invention the user defined data, or DNA, is used to provide an improved process which allows the user to generate the commissioning documentation from the pre-existing hardware documentation. The hardware documentation defining the hardware elements, but not the commissioning information, Thus it refers to the data produced at, for example step S104, Therefore the present invention provides an improved methodology for installing devices in an environment which overcomes many of the problems in the prior art. As such there is provided a new system and methodology for automatically generating commissioning documentation for use in programming building management system control software, from pre-existing hardware documentation. The system automatically converts hardware documentation, which is often in Microsoft® Excel Open Extensible Markup Language (XML) spreadsheet (xlsx) forma but can be in any machine readable format, and convert the documentation into commissioning documentation (one or more commissioning sheets). As described in greater detail below the system identifies each of the devices found on the commissioning hardware documentation and plots these into one or more commissioning sheets (the number of sheets produced is preferably based on the capacity of the control software panel type, such that each panel has its own commissioning sheet).

Figure 8:
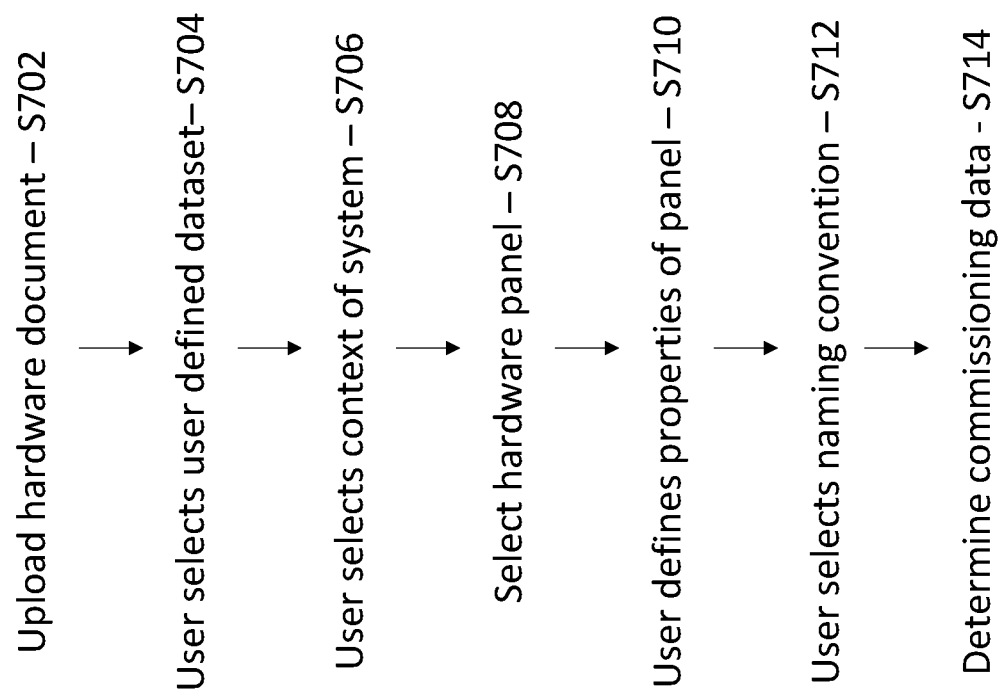
FIG. 8 is a flowchart of producing the commissioning data from a hardware figure.

FIG. 8 is a flowchart of the process according to an aspect of the invention.

At step S702 the user receives, or uploads, a hardware document which identifies the hardware elements. Such a document is one generated, for example at step S104 and S204 of FIGS. 2 and 3 respectively. The hardware documentation is in an embodiment, identified from the parsed image on which the indicia of the devices has been placed.

At step S704 the user selects a user defined dataset (DNA) which defines the behaviour of the devices. The user defined dataset is stored in a memory, such as a database, accessible to the user. The user defined dataset is determined as described with reference to FIG. 7.

At step S706 the context or discipline of the system is selected by the user. The discipline of the system is as described above with reference to FIG. 7. As described above the changes in the discipline would result in different behaviour and accordingly such knowledge is further used to help determine the commissioning data.

At step S708 the hardware panel element which is to be commissioned is selected by the user. As different hardware panels may exhibit different properties the panel is preferably selected at step S708.

Optionally further properties of the panel are defined at step S710. Such properties include the number of inputs per reader port of the hardware panel element selected at step S708. As is known in the art such panels have different numbers of inputs according to the panel type selected. Thus step S710 provides further configurable data in order to allow for the commissioning data to be determined.

Optionally, at step S712 naming conventions (as described with reference to FIG. 7) are further defined.

At step S714 based on the inputted data commissioning data for each panel is determined. As the panel type, and number of ports is identified the commissioning sheets for the panels are created based on the capacity of the panel. Once a panel is filled a new commissioning sheet for a new panel is created until such time that all devices are assigned.

The commissioning data is determined based on the user dataset, with the properties of the device corresponding to those defined in the dataset.

As such the process provides a consistent methodology for determining the commissioning data from the hardware data.

The invention claimed is:

1. A computer implemented method of identifying and programming one or more devices to be installed in an environment, the one or more devices being programmable by an installation system, the method comprising the steps of:
receiving, by a processor, an image file representative of the environment in which the devices are to be installed, said image file as received by the processor comprising one or more indicia representative of a category of device to be installed in the environment, said indicia comprising one or more icons with a category specific shape or look and data representative of the requirements of the category of device;
automatically parsing, by the processor, the image file to identify the category of device, requirements and location of the device represented by each of the one or more indicia;
receiving a user defined data set, said user defined data set defining one or more installable devices belonging to one or more categories of installable devices, including properties, configuration data and programming data associated with the one or more installable devices;
for some or all of the one or more indicia present on the image file, querying the category of device, requirements and location indicated by the indicia against the user defined data set to identify an installable device and properties, configuration data and programming data associated with the identified installable device from the user defined data set that complies with the category of device, requirements and location indicated by the indicia;
writing the properties, programming data and configuration data associated with the identified installable device to a configuration data file in a format readable by the installation system; and
programming the installation system with the configuration data and programming data associated with the identified installable device in the configuration data file.

2. The method of claim 1 wherein the devices to be installed are access controllers, said access controllers configured to control access to an access point in the environment, and the installation system is a security management system configured to control the access points.

3. The method of claim 1 wherein the user defined data set defines one or more of behavioural parameters for the one or more categories of installable device, logical settings, product selection, cost of installation, discipline of the environment.

4. The method of claim 3 wherein the behavioural parameters define the behaviours that the device exhibits in use.

5. The method of claim 4 wherein the behaviours of the device define how the device functions.

6. The method of claim 3 wherein the logical settings define how the device interacts with other devices within the environment that the device is installed.

7. The method of claim 3 wherein the discipline of the environment defines the usage scenario of the environment.

8. The method of claim 7 wherein the discipline is selected from the group of Advanced Access Control System, Closed Circuit Television, Car Park Management System, Electrical Containment, Hotel Access Control System, Hostile Vehicle Mitigation System, Intruder Holdup Alarm System, Security Safe, Wireless Art Detection System, Voice Communication Intercom.

9. The method of claim 1 wherein the devices to be installed are networked devices and the installation system is a network switch configured to control communication between the networked devices and a network.

10. The method of claim 1 wherein the indicia further comprises one or more of a block, tag, and metadata.

11. The method of claim 1, wherein the data representative of the requirements of the category of device to be installed comprises data relating to the priority of the access point and settings of the device to be installed.

12. The method of claim 1 wherein the image file is in an Auto computer-aided design (CAD) format.

13. The method of claim 1 wherein the step of writing properties, programming data and configuration data associated with the identified installable device to a configuration data file in a format readable by the installation system comprises exporting properties, programming data and configuration data associated with the identified installable device into a machine readable format.

14. The method of claim 1 further comprising the step of generating an installation drawing.

15. The method of claim 1 further comprising the steps of generating a report for one or more identified installable device.

16. The method of claim 15 wherein the report comprises information regarding the identified installable device selected from the group comprising: product details, installation history, subsequent usage of the device, commissioning time and costs.

17. The method of claim 1 further comprising the steps of checking for errors in the properties, configuration data and programming data associated with the identified installable device.

18. The method of claim 17 wherein the step of checking for errors further comprises ranking the identified errors in order of severity.

19. The method of claim 17 wherein the step of checking for errors includes one or more from the group consisting of: checking for an identified installable device which does not have any information associated with it; checking for two or more identified installable devices having duplicate identification data; checking for instances of duplicate configuration information for the same identified installable device; checking for two or more identified installable devices having duplicate positional information; checking two or more identified installable devices having incompatible position information; checking for an identified installable device which is out-of-date or inappropriate for the environment.

20. The method of claim 1 further comprising the steps of generating an operations and maintenance report.

21. The method of claim 20 wherein the operations and maintenance report comprises information and images of the identified installable device.

22. A system configured to identify and program one or more devices in an environment, the one or more devices being programmable by an installation system, the system comprising a process configured to perform the steps of:
receiving, by a processor, an image file representative of the environment in which the devices are to be installed, said image file as received by the processor comprising one or more indicia representative of a category of device to be installed in the environment, said indicia comprising one or more icons with a category specific shape or look and data representative of the requirements of the category of device;
automatically parsing, by the processor, the image file to identify the category of device, requirements and location of the device represented by each of the one or more indicia;
receiving a user defined data set, said user defined data set defining one or more installable devices belonging to one or more categories of installable devices, including properties, configuration data and programming data associated with the one or more installable devices;
for some or all of the one or more indicia present on the image file, querying the category of device, requirements and location indicated by the indicia against the user defined data set to identify an installable device and properties, configuration data and programming data associated with the identified installable device from the user defined data set that complies with the category of device, requirements and location indicated by the indicia;
writing the properties, programming data and configuration data associated with the identified installable device to a configuration data file in a format readable by the installation system, and
programming the installation system with the configuration data and programming data associated with the identified installable device in the configuration data file.

23. The system of claim 22 further configured to perform the method of claim 1.

24. The system of claim 22, further comprising a reverse engineering process for producing a standardized commissioning document from a pre-existing hardware document comprising information identifying one or more devices and their properties, the process configured to perform the steps of:
receiving, by a processor, the hardware document;
receiving a user defined data set, said user defined data set defining one or more installable devices belonging to one or more categories of installable devices, including properties, configuration data and programming data associated with the one or more installable devices;
selecting a context or discipline of the environment, the context or discipline of the environment defining the usage scenario of the environment;
selecting a hardware panel element which is to be commissioned;
for at least some of the one or more devices identified in the hardware document, querying the properties of the device identified in the hardware document against the user defined data set to identify an installable device and properties, configuration data and programming data associated with the identified installable device from the user defined data set that correspond with the properties of the device identified in the hardware document; and
generating the commissioning document.

* * * * *